(12) United States Patent
Lowles et al.

(10) Patent No.: US 8,676,793 B2
(45) Date of Patent: *Mar. 18, 2014

(54) SYSTEMS AND METHODS OF BUILDING AND USING CUSTOM WORD LISTS

(71) Applicant: Research In Motion Limited, Waterloo (CA)

(72) Inventors: Robert Lowles, Waterloo (CA); Jason T. Griffin, Waterloo (CA); Michael S Brown, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/739,021

(22) Filed: Jan. 11, 2013

(65) Prior Publication Data

US 2013/0132073 A1    May 23, 2013

Related U.S. Application Data

(63) Continuation of application No. 13/285,179, filed on Oct. 31, 2011, now Pat. No. 8,380,712, which is a continuation of application No. 12/651,747, filed on Jan. 4, 2010, now Pat. No. 8,073,835, which is a continuation of application No. 10/522,079, filed as application No. PCT/CA03/01103 on Jul. 23, 2003, now Pat. No. 7,650,348.

(60) Provisional application No. 60/397,680, filed on Jul. 23, 2002.

(51) Int. Cl.
    *G06F 17/30*    (2006.01)

(52) U.S. Cl.
    USPC ............ 707/724; 707/723; 707/748; 707/751

(58) Field of Classification Search
    USPC ............. 707/725, 723, 724, 748, 751; 704/9; 375/240.01
    See application file for complete search history.

(56) References Cited

U.S. PATENT DOCUMENTS

5,390,364 A    2/1995  Webster et al.
5,621,809 A    4/1997  Bellegarda et al.
(Continued)

FOREIGN PATENT DOCUMENTS

CA    2323856    4/2002
JP    2000183998    6/2000
(Continued)

OTHER PUBLICATIONS

Daniel Dreilinger et al., "Experiences with selecting search engines using metasearch," ACM, Jul. 1997, pp. 195-222.

(Continued)

*Primary Examiner* — Thuy Pardo
(74) *Attorney, Agent, or Firm* — Finnegan, Henderson, Farabow, Garrett & Dunner LLP

(57) ABSTRACT

Standard word lists that are often used for such operations as predictive text, spell checking, and word completion are based on general linguistic data that might not accurately reflect actual text usage patterns of particular users. Systems and methods of building and using a custom word list for use in text operations on an electronic device are provided. A collection of text items associated with a user of the electronic device is scanned to identify words in the text items. A weighting is then assigned to each identified word, and the words and corresponding weightings are stored.

22 Claims, 9 Drawing Sheets

(56) References Cited

U.S. PATENT DOCUMENTS

| | | | |
|---|---|---|---|
| 5,623,406 | A | 4/1997 | Ichbiah |
| 5,838,783 | A | 11/1998 | Cheng et al. |
| 5,920,837 | A | 7/1999 | Gould et al. |
| 5,937,422 | A | 8/1999 | Nelson et al. |
| 6,011,554 | A | 1/2000 | King et al. |
| 6,070,134 | A * | 5/2000 | Richardson et al. ............... 704/9 |
| 6,272,456 | B1 | 8/2001 | de Campos |
| 6,286,064 | B1 | 9/2001 | King et al. |
| 6,377,965 | B1 | 4/2002 | Hachamovitch et al. |
| 7,617,203 | B2 | 11/2009 | Awadallah et al. |
| 2002/0126097 | A1* | 9/2002 | Savolainen ................... 345/168 |
| 2002/0143828 | A1 | 10/2002 | Montero |
| 2002/0198979 | A1 | 12/2002 | Yu |
| 2003/0016873 | A1 | 1/2003 | Nagel et al. |
| 2003/0038788 | A1 | 2/2003 | Demartines et al. |
| 2003/0120846 | A1 | 6/2003 | Clapper |
| 2003/0161396 | A1* | 8/2003 | Foote et al. ............... 375/240.01 |
| 2003/0220913 | A1* | 11/2003 | Doganata et al. ................. 707/3 |
| 2004/0030543 | A1 | 2/2004 | Kida et al. |
| 2005/0027699 | A1* | 2/2005 | Awadallah et al. ............... 707/3 |
| 2005/0216448 | A1 | 9/2005 | Talib et al. |
| 2006/0277168 | A1 | 12/2006 | Hammond et al. |
| 2011/0238657 | A1 | 9/2011 | Hammond et al. |

FOREIGN PATENT DOCUMENTS

| | | |
|---|---|---|
| WO | WO9816889 | 4/1998 |
| WO | 03060451 A1 | 7/2003 |

OTHER PUBLICATIONS

European Search Report dated Nov. 5, 2010, in corresponding European Application No. 10174931.5-1527 (8 pages).

European Search Report dated Oct. 10, 2010, in corresponding European Application No. 09176236.9-1527 (5 pages).

Dunlop et al., "Predictive Text Entry Methods for Mobile Phones," Personal Technologies, XP-008003979, vol. 4, pp. 134-143, Jun. 2000 (10 pages).

Dunlop et al., "Predictive text entry methods for mobile phones," Submitted to Personal Technologies, XP-002289569, May 2000, pp. 1-10.

European Search Report dated Dec. 30, 2009 in corresponding European Application No. 09176236.9-1527 (10 pages).

Dunlop et al, "Predictive text entry methods for mobile phones", Submitted to Personal Technologies, [Online] May 2000, XP002289569 (1 page).

International Search Report issued on Jul. 23, 2003, for Application No. PCT/CA03101103.

Anonymous, "19 Adaptive Text Features" Tegic.com, [Online] Jul. 22, 2004, XP-002289570 (1 page).

* cited by examiner

SYSTEMS AND METHODS OF BUILDING AND USING CUSTOM WORD LISTS

CROSS REFERENCE TO RELATED APPLICATIONS

This application is a continuation of U.S. patent application Ser. No. 13/285,179, filed Oct. 31, 2011, which is a continuation U.S. application Ser. No. 12/651,747, now U.S. Pat. No. 8,073,835, filed on Jan. 4, 2010, which is a continuation of U.S. patent application Ser. No. 10/522,079, now U.S. Pat. No. 7,650,348, entitled "Systems and Methods of Building and Using Custom Word Lists," filed on Jan. 21, 2005, the entirety of which are herein incorporated by reference.

This application claims priority to U.S. Provisional Application 60/397,680, filed on Jul. 23, 2002. The entirety of which is herein incorporated by reference.

TECHNICAL FIELD

This invention relates generally to the field of text input processing, and in particular to building, using, and maintaining customized word lists for use in text operations.

BACKGROUND ART

Word lists for such operations as spell checking, text replacement, and predicting intended user input, typically referred to as predictive text, are known. These word lists are often used in conjunction with such computer programs as word processing applications, email applications, spreadsheet applications, and other computer programs that require the input of text.

Although spell checking and text replacement are useful in many different types of device, predictive text methods are particularly helpful for devices with limited keyboards, in which text inputs may be ambiguous because each key represents a plurality of characters. For example, a user of a mobile phone having an ITU E 1.161 Standard Key Pad typically uses a multi-tap method to achieve proper character inputs. On this keypad, the "2" key represents the letters A, B, and C. During text entry according to a multi-tap method, the user presses the "2" key once to obtain an input of "A", twice to enter a "B", and three times to enter a "C". These types of multi-tap methods can be utilized for so-called reduced QWERTY keyboards, in which the general QWERTY keyboard layout is maintained, but with fewer keys than a standard QWERTY keyboard. Predictive text methods have been applied in conjunction with such keypads and keyboards to reduce the reliance on multi-tap methods.

However, known word lists for these text operations are generated from standard language data, including word and frequency information, that does not reflect the actual text usage patterns of many users. Acronyms, names, technical terms, and the like, do not often appear in such word lists, which are therefore of limited value to some users.

DISCLOSURE OF INVENTION

In one aspect of the invention, a method of building a custom word list for use in text operations on an electronic device, comprises the steps of scanning a collection of text items associated with a user of the electronic device to identify words in the text items, assigning a weighting to each identified word, and storing each identified word and its corresponding weighting.

According to another aspect of the invention, a system for building a custom word list for use in text operations on an electronic device comprises a first data store for storing a collection of text items associated with a user of the electronic device, a scanning module configured to scan the collection of text items to identify words in the text items, a weighting module configured to assign a weighting to each identified word, and a second data store for storing each identified word and its corresponding weighting.

In accordance with a further aspect of the invention, a method of processing a custom word list for use in text operations on an electronic device, the custom word list including words identified in a collection of text items associated with a user of the electronic device and corresponding weightings assigned to the words, comprises the steps of mapping each word to a keystroke sequence on the electronic device, and storing the Words and their corresponding weightings and keystroke sequences at the electronic device.

A system for processing a custom word list for use in text operations on an electronic device, the custom word list including words identified in a collection of text items associated with a user of the electronic device and corresponding weightings assigned to the words, according to a related aspect of the invention, comprises a key mapper for mapping each word to a keystroke sequence on the electronic device, and a word list loader configured to receive the custom word list and mapped keystroke sequences, and to store the custom word list and the mapped keystroke sequences at the electronic device.

According to another aspect of the invention, a method of using a custom word list in text operations on an electronic device, the custom word list including words identified in a collection of text items associated with a user of the electronic device and corresponding weightings assigned to the words, comprises the steps of receiving inputs from a user on the electronic device, and accessing the custom word list to identify words in the word list representing possible variants of the inputs.

A method of maintaining a custom word list in text operations on an electronic device, the custom word list including words identified in a collection of text items associated with a user of the electronic device and corresponding weightings assigned to the words, and having been generated and stored at a computer system and transferred to the electronic device in accordance with yet another aspect of the invention, comprises the steps of detecting that a word entered by a user does not appear in the custom word list, assigning a weighting to the word entered by the to user, adding the word entered by the user and its corresponding weighting to the custom word list at the electronic device, and transferring the word entered by the user to the computer system.

Other aspects and features of the present invention will become apparent to those ordinarily skilled in the art upon review of the following description of specific embodiments of the invention in conjunction with the accompanying figures.

BRIEF DESCRIPTION OF DRAWINGS

Embodiments of the present invention will now be described, by way of example only, with reference to the attached Figures, wherein.

BEST MODE FOR CARRYING OUT THE INVENTION

Figure 1:
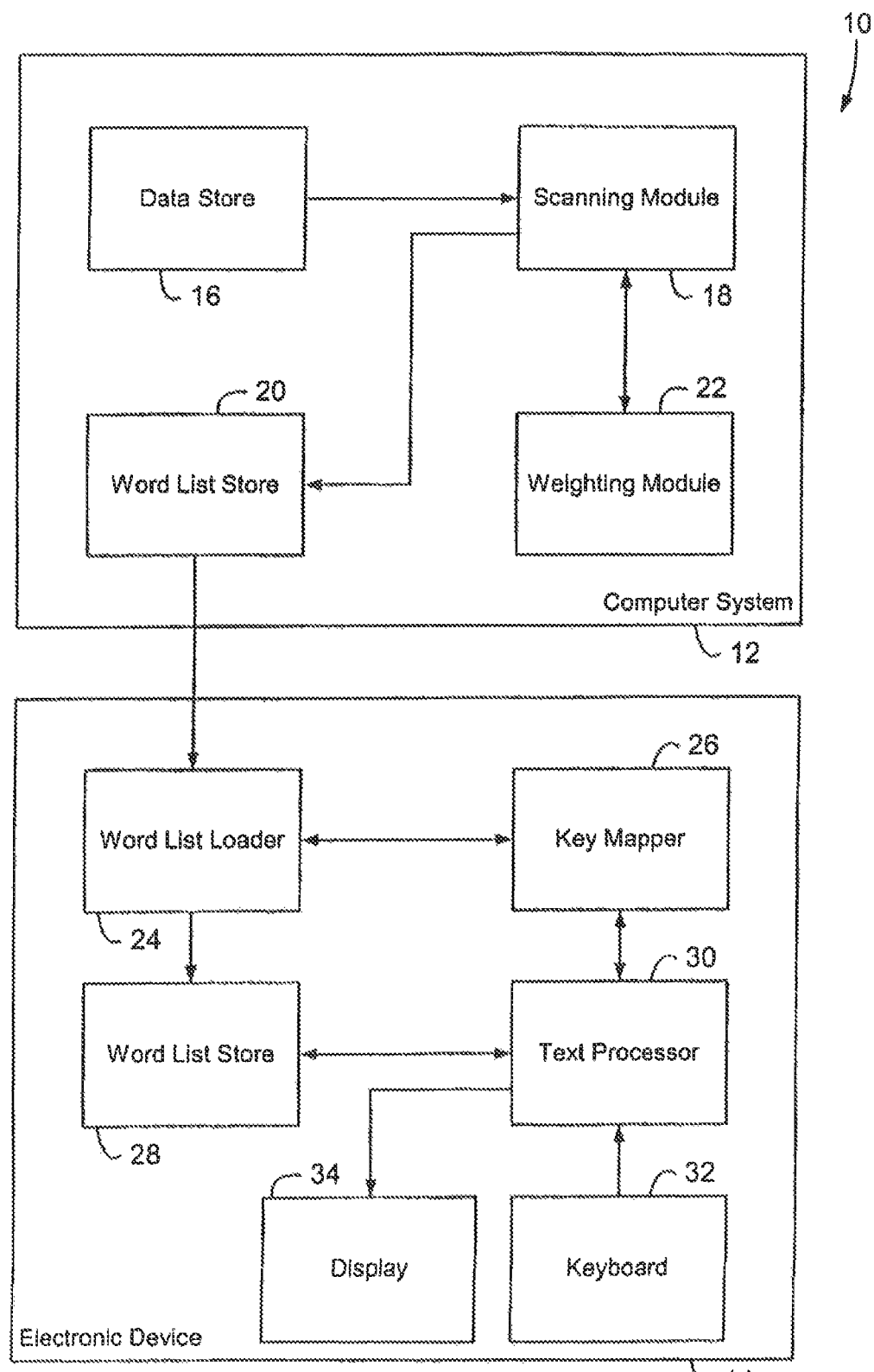
FIG. 1 is a block diagram of a system of building and using a custom word list.

Referring now to the drawings, FIG. 1 is a block diagram of a system of building and using a custom word list. Such a custom word list is preferably used in text operations on an electronic device for spell checking, text replacement, predictive text, or some combination thereof.

The system 10 includes a computer system 12 and an electronic device 14, both of which belong to, or are at least used by the same user. A data store 16, a scanning module 18, a weighting module 22, and a word list store 20 are implemented at the computer system 12, and a word list loader 24, a key mapper 26, a word list store 28, a text processor 30, a keyboard 32, and a display 34 are implemented at the electronic device 14. It should be appreciated that a computer system such as 12 and an electronic device such as 14 typically include components in addition to those shown in FIG. 1. However, only the components involved in building and using a word list have been shown in FIG. 1.

The data store 16 stores text items that are associated with a user of the computer system 12 and the electronic device 14. The data store 16 is, for example, one or more storage areas of a local hard disk on the computer system 12 or a removable storage medium such as a floppy disk, CD, or DVD compatible with a reader at the computer system 12. The data store 16 may also be implemented at a remote store, at a network server accessible to the computer system 12, for example, or in other types of storage media. It should be apparent that the data store 16 may include storage areas in more than one memory component or medium.

The scanning module 18 is configured to scan a collection of text items in the data store 16. Text items include, for example, sent email messages, documents, acronym lists, and existing word lists. The scanning module identifies words in the text items, and is preferably implemented as a software application, utility, or module. Scanned text items include all text items in the data store 16, user-selected text items, or predetermined text items. For example, the scanning module 18 may be further configured to receive a selection input from a user to select text items to be included in the collection of text items to be scanned. In alternative embodiments, the scanning module 18 scans predetermined types of text items in the data store 16, or text items in predetermined directories, folders, or locations in the data store 16. It is also contemplated that the scanning module 18 may scan both a predetermined set of text items as well as a set of text items selected by the user.

The weighting module 22, also preferably implemented in computer software, assigns a weighting to each word identified by the scanning module. Any of a plurality of weighting schemes may be applied by the weighting module. In one embodiment, the weighting module 22 assigns a weighting based on a frequency of occurrence of each identified word. By determining a number of occurrences of each identified word and identifying a maximum number of occurrences, for example, a relative or normalized frequency of occurrence of each word can be calculated.

Although frequency of occurrence is a common weighting factor, other characteristics of text items may also or instead be used to determine or adjust weightings of identified words. In some implementations, different sources of text items may be associated with different priorities or levels of importance. Where the scanning module 18 or the weighting module 22 determines a source of a text item in which each word is identified, then source-based weighting is possible. User text item sources such as sent email items or documents that were authored by the user tend to reflect user text usage patterns more closely than "external" text item sources such as received email messages. As such, higher weightings may be assigned to words identified in text items from user text item sources.

The word list store 20 stores each identified word and its assigned weighting. Like the data store 16, the word list store 20 may be implemented in any of a plurality of storage components or media. In a typical implementation, the word list store 20 and the data store 16 occupy different storage areas on a hard disk of the computer system 12.

On the electronic device 14, the word list loader 24 is configured to receive the identified words and their corresponding weightings from the word list store 20, and to store the words and weightings to the device word list store 28. The connection between the word list loader 24 and the word list store 20 may be a physical link using a serial or Universal Serial Bus (USB) connection, for example, or a wireless link using such interfaces as Infrared Data Association (IrDA) ports, Bluetooth™ modules, 802.11 modules, and wireless transceivers and wireless communication networks. Those skilled in the art will appreciate that "Bluetooth" and "802.11" refer to sets of specifications, available from the Institute of Electrical and Electronics Engineers (IEEE), relating to wireless personal area networks and wireless local area networks, respectively.

The key mapper 26 maps each identified word to a keystroke sequence on the keyboard 32 of the electronic device 14. The key mapper 26 determines which key in the keyboard 32 is associated with each character of an identified word to generate a keystroke sequence for the identified word. In another embodiment described in further detail below, a key mapper is also implemented on the computer system, in which case the computer system retrieves information about the keyboard layout of the electronic device from the electronic device and generates the keystroke sequences on the computer system, storing those keystroke sequences in the word list. Such keystroke sequence mapping is particularly useful in predictive text operations on a device having a limited or reduced keyboard including keys that are associated with more than one character.

The text processor 30 is a component of the electronic device 14 that uses the custom word list in text operations. In a preferred embodiment, the text processor 30 is a software module or utility that is operable in conjunction with one or more functions, systems, or software applications on the electronic device 14. The text processor 30 is invoked either automatically when a user performs a text operation on the electronic device 14 or when the user enables or turns on the text processor 30. Functionality of the text processor 30 may also or instead be incorporated into software applications that are used to perform text operations.

For example, the text processor 30 may be a predictive text engine that operates in conjunction with such software applications as an email program and a word processor on an electronic device. Although predictive text functions are particularly useful in conjunction with limited or reduced keyboards in which text inputs may be ambiguous, the keyboard 32 is either a reduced keyboard or a full text keyboard such as a QWERTY, DVORAK, or other type of keyboard. As described above, a custom word list has further applications such as spell checking and text replacement that are applicable whether or not text inputs from a keyboard are ambiguous.

The display 34 is used to present information, such as entered text, to a user of the electronic device 14. On portable electronic devices such as wireless mobile communication devices, for example, liquid crystal displays (LCDs) are common. Where the electronic device is another computer system, the display 34 is likely a computer monitor. The type of display 34 is dependent on the type of the electronic device 14.

In operation, the scanning module 18 scans a collection of text items, in the data store 16, associated with a user of the electronic device 14. If the computer system 12 is used only by the user of the electronic device, as is often the case with a personal computer system, then any text items such as documents and sent email messages stored at the computer system 12 are typically associated with the user. However, if the computer system 12 is used by multiple users, then the scanning module 18 preferably scans text items associated with the user of the electronic device 14. As those skilled in the art will appreciate, each user of a multiple-user computer system typically has a different login or network account or other identity and associated storage areas. Although reference is made herein to text items associated with the user, the association need not necessarily be exclusive. The collection of text items may include text items associated with the user of the electronic device 14 as well as other users, such as a corporate word list or a list of commonly used corporate acronyms, for instance.

The scanning module 18 identifies words in the collection of text items. Words are typically delineated by spaces or punctuation in the text of scanned text items, although the scanning module 18 is preferably configurable to identify phrases or strings as single words. Email addresses, hyperlinks, and signature blocks represent examples of types of phrases or strings that a user may wish to identify as single words. Each of these types of phrases or strings has characteristics that allow them to be identified by the scanning module 18. Email addresses have a general format of a text string with no spaces, including a user name followed by an "©" symbol and then a domain name with one or more periods. Hyperlinks also have a to common general structure. Signature blocks comprise groups of words that frequently occur together at the end of a text item.

The weighting module 22 determines a weighting for each identified word, in the implementation shown in FIG. 1, the weighting module provides the weighting for each word to the scanning module 18, which stores the identified words and their weightings to the word list store 20. Alternatively, the scanning module 18 stores the identified words to the word list store 20, and weighting module 22 accesses the identified words in the word list store 20 and writes the corresponding assigned weightings to the word list store 20.

These operations build a custom word list for the user of the electronic device 14. According to another aspect of the invention, this word list is further processed for use on the electronic device. The word list loader 24 receives the identified words and their weightings from the word list store 20. For each identified word, the key mapper 26 determines a sequence of keys on the keyboard 32 that a user operates to enter the word. The identified word is mapped to the keystroke sequence by storing the keystroke sequence to the word list store 28. In FIG. 1, the key mapper 26 provides keystroke sequences to the word list loader 24, which stores the identified words and their corresponding weightings and keystroke sequences to the word list store 28. As described above for the weighting module 22, however, the key mapper 26 may alternatively access the identified words from the word list store 28, determine the corresponding keystroke sequences, and then store the keystroke sequences to the word list store 28.

Key mapping at the electronic device 14 provides for adapting a single word list for use on any electronic device with a key mapper 26. Different keyboards often have different keystroke sequences corresponding to at least some of the words in a word list. Providing a key mapper 26 on the electronic device 14, adapted to the particular device keyboard 32, allows one word list to be mapped for use on any such device. The user is thereby enabled to port his or her custom word list to all electronic devices that they use. This functionality becomes particularly important when the user acquires a new device with a different keyboard layout, for example.

In an alternative embodiment, device-specific key mapping is performed at the computer system 12. In this case, a key mapper resides on the computer system 12. A key mapper on the computer system 12 is either adapted to one or more particular type of electronic device or configurable to map identified words to any one of a plurality of electronic devices. For example, in one contemplated embodiment, the key mapper is enabled to determine a type of electronic device attempting to load a word list from the word list store 20. The key mapper then maps the identified words accordingly, and transfers the identified words and their corresponding weightings and keystroke sequences to the electronic device.

In use, the custom word list stored in the word list store 28 is accessed by the text processor 30 in response to user inputs on the keyboard 32. As will be described in further detail below, the text processor 30 searches the custom word list for words that are mapped to keystroke sequences corresponding to an entered keystroke sequence. In a predictive text function, for example, these words from the custom word list are then presented to the user on the display 34. An input word is then selected based on subsequent user inputs. As will also be described below, the custom word list may be maintained by adding new user-entered words in the custom word list, adjusting weightings based on usage of words in the custom word list, deleting words from the custom word list, and updating the word list stored in the word list store 20.

Figure 2:
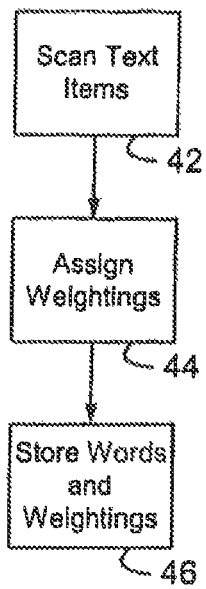
FIG. 2 is a flow diagram of a method of building a custom word list.

Turning now to FIG. 2, a flow diagram of a method of building a custom word list is shown. At step 42, a collection of text items associated with a user is scanned to identify words. The collection of text items includes predetermined text items or types of text items, text items selected by a user, or both. For user selected text items, a selection input is made by a user via a keyboard, mouse, or any other input device compatible with either a computer system through which text items are accessible or an electronic device, if the electronic device is connected to or can communicate with the computer, as shown in FIG. 1. The collection of text items may include different types of text items, such as documents, emails and other messages, essays, letters, reports, acronym lists, and existing word lists.

After the text items are scanned, weightings are assigned at step 44 according to such a weighting scheme as frequency-based weighting, described above. Another variation of frequency-based weighting calculates weightings based to on both time and frequency. A word is assigned a more significant weighting if the user has used the word recently, as determined by tracking the date and/or time associated with scanned text items. Alternatively, the number of times an identified word occurs may be assigned as the weighting at step 44. Other weighting schemes will also be apparent to those skilled in the art.

At step 46, the identified words and their corresponding assigned weightings are stored.

FIG. 2 illustrates a basic implementation of custom word list building. A method of building a custom word list may also involve further steps and operations. For example, the words identified at step 42 may be categorized into categories. Where identified words are categorized, an indicator of the category of each identified word is preferably stored with the word and its corresponding weighting. Categories may include mailing address, email address, name, hyperlink, recurring word grouping, different language categories, acronyms, and user added words, for example.

Any of several techniques may be used to determine word categories. Some categories are inferred based on characteristics of words in a particular category, as described above for email addresses and hyperlinks. Mailing addresses also have a general pattern of capitalized words for name, street, city, state, province, and country, followed by numbers and letters for a postal code or numbers for a zip code. Names are characterized by capital letters, such that words that begin with a capital letter but do not follow a period might be categorized as names. Acronyms often include a series of capitalized letters. Recurring word groupings such as signature blocks occur in text items together, often in a particular location within a text item, such as at the end of an email message. Where the collection of text items includes an existing word list with category indicators, the category indicators from the existing word list could be carried into the custom word list. For some types of text items, category is inherent in a field of the text item in which the word is identified. A "To:" field of an email message contains email addresses, for example. Uses of categories in a custom word list are described in further detail below.

Figure 3:
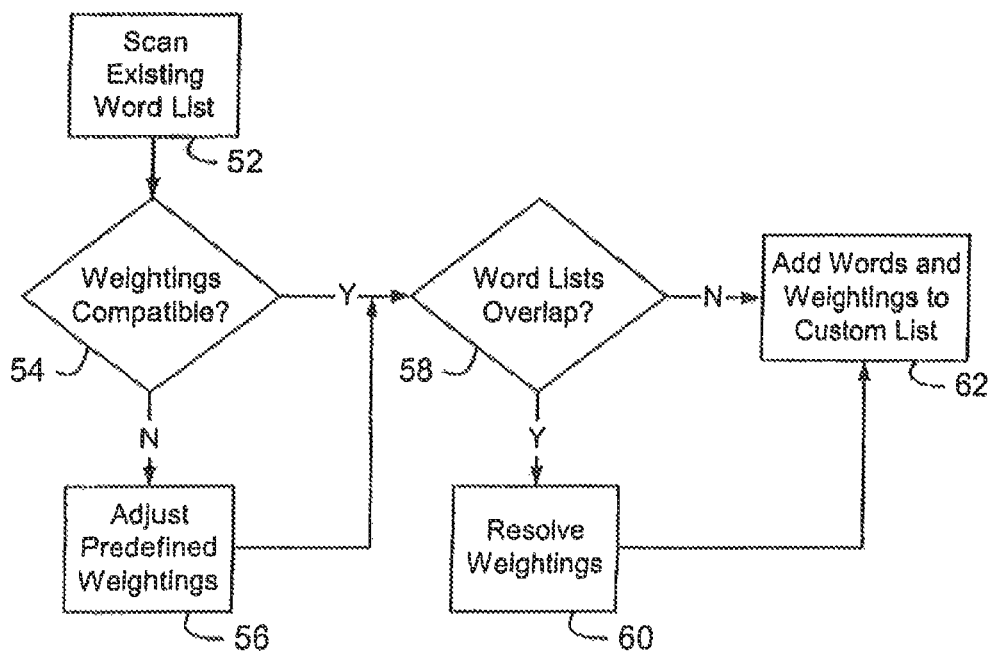
FIG. 3 is a flow diagram illustrating a method of integrating an existing word list and a custom word list.

Existing word lists, in the collection of scanned text items or in a word list store on a computer system or the electronic device, are somewhat of a special case. FIG. 3 is a flow diagram illustrating a method of integrating an existing word list and a custom word list.

At step 52, the existing word list is scanned. As will be apparent, an existing word list may be integrated with a custom word list without necessarily scanning the existing word list. A determination is made at step 54 as to whether the predefined weightings in the existing word list and the weighting scheme used for the custom word lists are compatible. For example, where the weighting scheme assigns normalized frequencies of occurrence as the weightings for the custom list, than the determination at step 54 may be made by searching for any predefined weightings of greater than 1. Alternatively, incompatible predefined weightings may be assumed by default. It is also possible that the existing word list has only words, without predefined weightings.

Where the predefined weightings in the existing word list are not compatible with the weighting scheme, then the method proceeds to step 56, in which the predefined weightings for each word in the existing word list are adjusted or converted into converted weightings. Conversion functions include, for example, normalizing absolute predefined weightings, assigning weightings where predefined weightings do not exist, or applying a predetermined conversion factor to the predefined weightings. Compatible weightings are preferably maintained at step 54. Alternatively, both the predefined weightings and the weightings assigned according to the weighting scheme may be converted to a common weighting.

At step 58, a check for overlap between the word lists is made, to determine whether any of the words in the custom word list occur in the existing word list, or vice versa. For any words that occur in both lists, the weightings are resolved at step 60, and a resolved weighting is assigned. The function of resolving weightings may be accomplished, for example, by calculating the resolved weighting based on the predefined weighting and the weighting in the custom word list, or by selecting one or the other weighting as the resolved weighting. Preferably, a weighting in the custom word list takes precedence over a predefined weighting in an existing word list, and is therefore selected as the resolved weighting in the latter type of resolution mechanism. A predefined weighting, an adjusted or converted weighting, or a resolved weighting, and each word from the existing word list that does not occur in the custom word list, are added to the custom word list at step 62.

Word list integration is performed by either a system at which a custom word list is built, such as the computer system 12 (FIG. 1) or a system at which the custom word list is used, the electronic device 14 in FIG. 1. Although FIG. 3 refers to only words and weightings, word lists may be integrated after key sequences have been mapped to words in any or all word lists.

Particularly on constrained devices in which memory space, power supply life, and processor speed and power are limited, it may be desirable to limit the size of the custom word list. To this end, step 62 may determine whether the custom word list has reached a predetermined size before words from the existing list are added at step 62. Whereas it is unlikely that replacing a weighting in a custom list will increase the size of the list, adding a new word and its corresponding weighting results in a larger list. Where the custom list has reached a predetermined size, words having lowest weightings are preferably deleted before the new words are added. Deletion may defer to a user confirmation input to confirm that lowest weighting words should be deleted. One possible use for the category indicators described above is to perform category-specific word list deletions. Words having lowest weightings in one or more categories may be deleted before new words are added. In an alternate embodiment, words that have lowest weightings and are not in one or more protected categories could be deleted. In this manner, important words such as those that are entered by a user and marked as protected words or in a protected category in the custom word list are protected from automatic deletion by deleting words having lowest weightings among non-protected words in the custom word list.

Integration of word lists including words and possibly corresponding weightings is described above. However, in the case of an existing text replacement word list or dictionary that is used on the electronic device to replace input words with associated replacement words, often referred to as "autotext", slightly different integration operations may be desired. As a preliminary step for integration of a text replacement word list and a custom word list, it is preferably determined whether each input word and replacement word occurs in the custom word list. For each input word or replacement word that does not occur in the custom word list, a weighting is preferably assigned to the input word or the replacement word, and both the input word and the replacement word are mapped to a keystroke sequence on the electronic device, such that a replacement word is mapped to the keystroke sequence of the corresponding input word. The input word, the replacement word, or both if necessary, and their corresponding weightings and keystroke sequence are added to the custom word list. If a replacement word already occurs in the custom word list, then the replacement word is mapped to the keystroke sequence of its corresponding input word. This mapping may be reflected in the custom word list by appending the keystroke sequence of the input word corresponding to the replacement word to an entry in the custom word list for the replacement word, or by adding a new entry in the custom word list for the replacement word, the new entry including the keystroke sequence of the input word corresponding to the replacement word.

Integration of a text replacement word list is preferably performed after key mapping, because the text replacement word list effectively maps a replacement word to the keystroke sequence of its corresponding input word. If this integration were performed prior to key mapping, then the replacement word might be mapped to its own keystroke sequence, and text replacement functionality is lost. As an alternative, a text replacement word list or function may be maintained separately, such that text input makes use of a custom word list, and input words are then replaced as indicated in the text replacement word list.

According to another aspect of the invention, a custom word list that has been loaded onto an electronic device from a system on which the word list was built and then changed on the electronic device is transferred back to the system. The system that built the original word list then has an updated custom word list for subsequent use, and possible loading onto other electronic devices. Such changes may result from integration of a custom list with an existing word list on the device, or from new words being added to the custom list responsive to user inputs as described in further detail below. Where the custom list as stored on the electronic device includes key sequence mappings, these mappings are preferably removed from the copy of the custom word list that is transmitted back to the system, either at the electronic device or at the system before the custom word list incorporating the changes is stored at the system. Alternatively, updates to the custom word list, instead of the entire custom word list, are transferred back to the word list building system.

Custom word list building at the building system may also be an ongoing process. This function is enabled, for example, by configuring the scanning module 18 and the weighting module 22 (FIG. 1) to scan new documents stored in the data store 16, to adjust weightings or assign new weightings as required, and to update the custom word list in the word list 20. An updated word list, or just updates to the list, is transferred to the electronic device 12.

Word lists or updates are transferred between the building system and the electronic device as they occur, when the electronic device and the building system are connected or can communicate with each other, at predetermined intervals or times, or as directed by the user. Other update or transfer schemes will be apparent to those skilled in the art.

Figure 4:
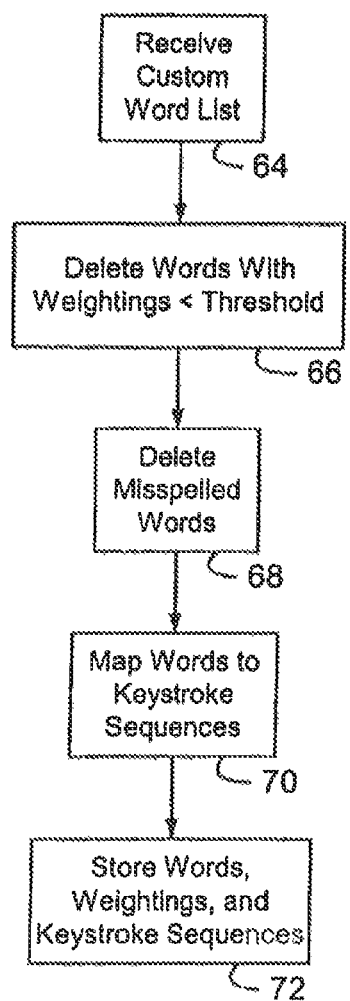
FIG. 4 is a flow diagram of a method of processing a custom word list.

FIG. 4 is a flow diagram of a method of processing a custom word list. As described above, a custom word list is preferably processed when or before it is loaded onto an electronic device. At step 64, the custom word list is received from the building system. However, it should be appreciated that the processing operations may be performed at either the word list blinding system or the electronic device on which the custom word list is to be used. In some embodiments, the building system also uses the custom word list in text operations. Therefore, the step of receiving the custom word list may involve receiving the custom word list from an external word list building system or simply accessing the list from a word list store.

As shown in FIG. 4, other processing operations may be performed when or before a custom word list is loaded onto an electronic device, to reduce the size of the list or to limit the list to relatively frequently used words, for example. At step 66, words having a corresponding weighting below a threshold weighting are detected and deleted from the custom word list. A spell check operation on the custom word list detects misspelled words in the custom word list, which are deleted at step 68. Such word deletion, as described above, may be category-specific or subject to user confirmation. The operations at steps 66 and 68 may be performed after key mapping, but are preferably performed before key mapping, as shown in FIG. 4. This avoids the time and resources associated with mapping infrequently used and misspelled words in the custom word list.

At step 70, each word in the custom word list is mapped to a keystroke sequence on a keyboard of the electronic device. During the mapping operation, the keyboard key associated with each character in each word is determined. The words and their corresponding weightings and keystroke sequences are then stored at the electronic device at step 72. On a limited or reduced keyboard, each key is associated with at least one character, although the present invention is also applicable to electronic devices with full keyboards.

Another optional processing operation, not shown in FIG. 4, is sorting the custom word list based on key mapping. For example, words having the same mapped keystroke sequences are preferably grouped together in the custom word list and then sorted by weighting. This arrangement of words in the custom word list may reduce search time and avoids real-time sorting of words when the word list is used during text operations.

Figure 5:
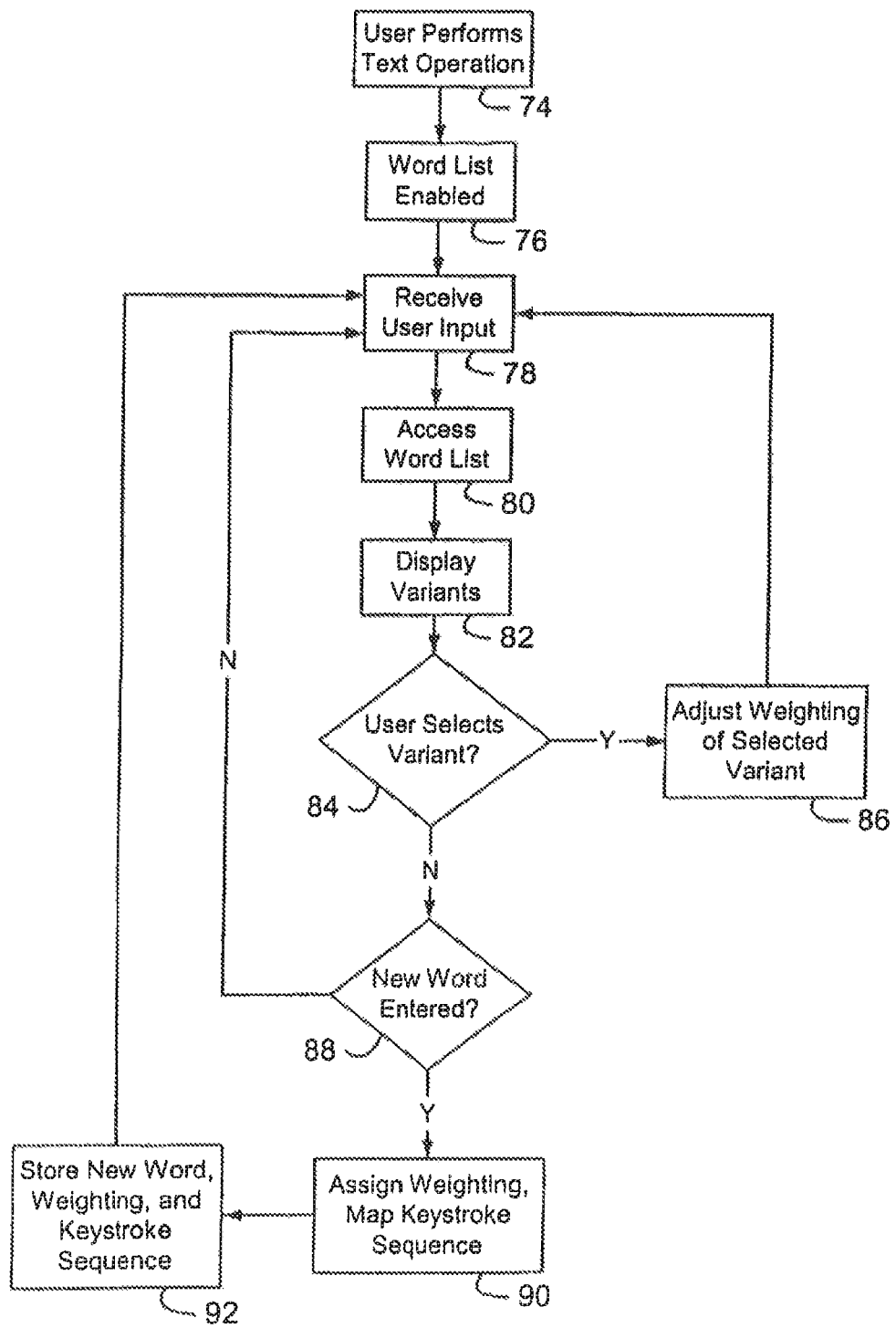
FIG. 5 is a flow diagram illustrating a method of using and maintaining a custom word list.

FIG. 5 is a flow diagram illustrating a method of using and maintaining a custom word list.

In step 74, the user starts or performs a text operation, by opening a text editor, email program, or other software application or function involving some sort of text input or processing, such as composing a document or message. At step 76, word list functions are enabled. As described above, step 76 may be performed automatically when a text operation or software application is invoked on an electronic device, or as directed by the user.

User input is received at step 78, when the user begins typing on a keyboard, for example. The custom word list is then accessed at step 80 to identify words in the custom word list representing possible variants of the received inputs. Where the keyboard is a reduced keyboard, then an input keystroke sequence may be ambiguous, such that more than one word in the custom word list is mapped to the input keystroke sequence. When the custom word list is used for predictive text, the words mapped to the input keystroke sequence are predictive text variants associated with the received inputs. If the custom word list is used for word completion, then the variants are word completion variants that are mapped to keystroke sequences that begin with the input keystroke sequence, but possibly extend beyond the input keystroke sequence. Word completion may also be useful in conjunction with full keyboards. In this case, variants may be identified based on input characters instead of mapped key sequences, because each key is associated with one input character.

A list of variants is displayed to the user at step 82. The variants are preferably sorted according to their corresponding weightings in the custom word list to generate a sorted list of variants for display to the user. Alternatively, the variants are sorted according to category, or first by category and then by weighting, such that variants in each category are sorted according to their corresponding weightings.

Categorization of words in the custom word list also enables category-based searching of the custom word list, such that words in one or more categories in the custom word list are accessed at step 80. Categories may be used to establish access or searching priority, so that words in certain categories are accessed in some predetermined order, or filtering rules, where only particular categories are accessed or searched. Category-based access is useful where certain types of text operation are associated with particular categories. In this instance, a type of text operation being performed and any associated categories are preferably determined, and the associated categories are accessed. When a user is currently entering text in an address field of an email message, for example, accessing words in an email address category or sorting words by category may provide a more useful list of variants. Although email addresses may have relatively low weightings, category-based access, filtering, or sorting provides the most relevant words at or near the top of a list of variants. Other types of text operation, such as entering text on a form with distinct fields in which particular types of information are normally entered, entering a URL or hyperlink in a browser address line, and replying to a message written in another language, for example, might also be suitable for category-based access, filtering, or sorting. In a preferred embodiment, the user may also manually enable category-based word list operations when desired. Categories might also be inferred from a current context, such that words in an acronym category are accessed when a user inputs two uppercase letters in sequence, words in a name category are accessed when a user inputs an uppercase letter that is not preceded by a period, words in an email address category when a user input of an "@" symbol is not preceded by a space, and words in a hyperlink category are accessed upon user input of other than a space after a period, for instance.

A variation of category-based custom word list access is "on-the-fly" weighting adjustment. If a current text operation is normally associated with a particular category, then weightings of words in that category are increased, by applying a predetermined adjustment factor to the weightings, for example. Words in the associated category thereby have a more significant weighting during an associated text operation. The adjustment factor is selected to achieve a desired effect. A higher adjustment factor ensures that words in the category have higher adjusted weightings than words in other categories, whereas a lower adjustment factor may prevent infrequently used words in the category from displacing more frequently used words in other categories. Such on-the-fly weighting adjustments are preferably temporary, persisting only as long as text operations associated with the same category are in progress.

At step 84, it is determined whether a user selects one of the displayed variants as an intended input, by providing a selection input to select a variant. In response to a keystroke on a spacebar key, for example, the first variant in the displayed list is selected. Punctuation symbols may also be recognized as selection inputs, although in the case of hyperlinks or email addresses, punctuation symbols that are not followed by a space may be allowed. If another variant is the intended input, then the user selects the variant, for instance, by moving a cursor and selecting the variant. Where one of the variants is selected, the weighting of the selected variant is preferably adjusted at step 86. In this manner, the most frequently and recently used words in the custom word list maintain or gain higher weighting than less frequently used words.

Where one of the variants is not selected, it is then determined whether a new word has been entered. If the user continues typing characters other than a space, to which as described above is preferably a selection input, then a new word has not been entered, and the method returns to step 78. Steps 80, 82, and 84 are preferably repeated for each character entered by the user. Further preferably, for each keystroke in an input sequence of keystrokes for character entry, step 80 accesses only variants identified in the custom word list for the preceding keystroke. In this manner, fewer entries in the custom word list are accessed for each subsequent keystroke following a first keystroke in an input sequence, which results in progressively faster access operations as a user types an input word. After a variant is selected or a new word is entered, step 80 reverts back to the entire word list, and then proceeds as described above for each keystroke in a current input sequence, until another variant is selected or another new word is entered.

If entry of a new word by the user is detected at step 88, then a weighting is assigned to the new word, its keystroke sequence is mapped (step 90), and the new word, weighting, and keystroke sequence are added to the custom word list at step 92. An existing word may be deleted from the word list as described above if the word list reaches a certain size. Such an update to the custom word list is also preferably transferred back to the system at which the custom word list was first generated, if the custom word list was not generated at the electronic device on which it is used. User entered words are preferably marked as protected words or associated with a protected category so that they are not deleted from the custom word list. Although not explicitly shown in FIG. 5, it should be appreciated that a user may instead be prompted to determine whether a new entered word should be added to the custom word list, for instance to avoid adding misspelled or very infrequently used words to the custom word list.

In one embodiment, a new word is entered by the user by switching to a manual typing mode, which disables word list operations either temporarily, while a current word is entered, or until subsequently enabled again. Manual typing mode is preferably a multi-tap mode on a limited keyboard such as a phone keypad or a reduced QWERTY keyboard. Alternatively, the manual mode may utilize a virtual keyboard on a device touchscreen instead of a physical keyboard. In a further embodiment, the manual mode uses character recognition to interpret individual characters written by the user on a touchscreen or touchpad. Yet another embodiment of manual mode is handwriting recognition, where the device recognizes full words and text from the user's handwriting on a touchscreen or touchpad.

Occasionally, a user-entered word is in the custom word list but was low on a sorted list of variants. In order to avoid adding such a user-entered word to the custom word list, which would result in two entries in the custom word list for the same word, the custom word list is preferably searched for the user entered word. If the user-entered word already occurs in the custom word list, then its corresponding weighting is adjusted as described above in conjunction with step 86, and the existing entry is preferably marked as a user added word or a protected word, or associated with a protected category.

Certain types of text input, including email addresses and hyperlinks for example, are often formed from a combination of words, each of which may be in the custom word list separately. For these types of input, the custom word list is preferably searched for words having keystroke sequences that, when concatenated, contain a current input sequence of keystrokes. Any such words in the custom word list are then identified as variants.

As described above, an electronic device may include a text replacement dictionary that includes input words mapped to respective replacement words. One option for preserving text replacement functionality with a custom word list is to integrate the text replacement dictionary with the custom word list. A further option is to integrate searching of the text replacement dictionary searching with custom word list searching. In this case, the text replacement dictionary is searched for an input word corresponding to each variant that has been identified in the custom word list. Where an input word corresponding a variant is found in the text replacement dictionary, the replacement word to which the input word is mapped is displayed as another variant. Text replacement dictionary searching might instead be performed after a variant has been selected or a new word has been entered. If the text replacement dictionary includes the selected variant or the entered new word as an input word, then the selected variant or new word is replaced with the replacement word to which the input word is mapped.

Figure 6:
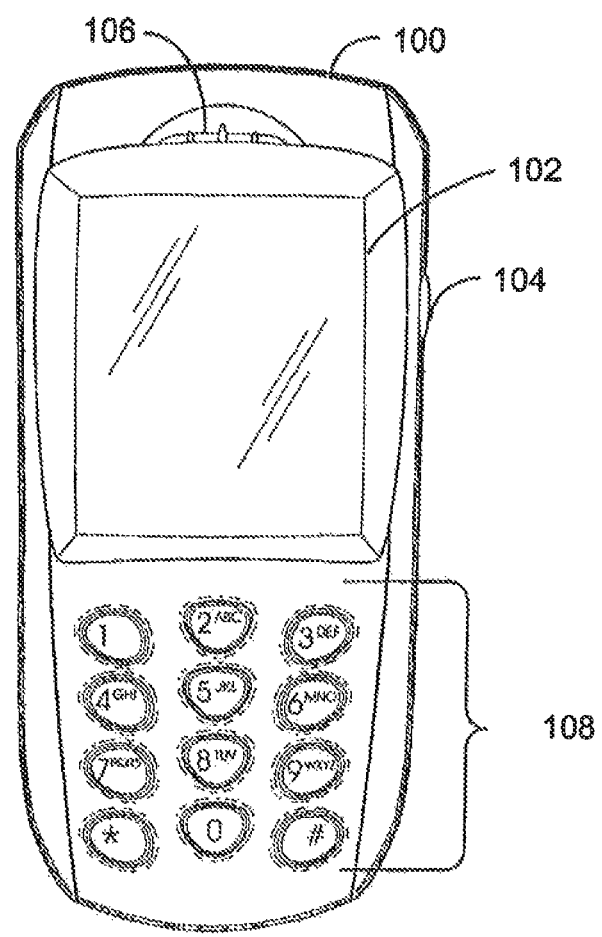
FIG. 6 is a top plan view of a device with a keypad.

FIG. 6 is a top plan view of a device with a keypad. The device 100 comprises a display 102, an auxiliary input device 104, a voice communication means 106, and a keypad 108. The auxiliary input device 104 is a thumbwheel, a button, or some other means of input. The voice communication means 106 is preferably a speaker and microphone combination.

The keypad 108 is an ITU E 1.161 Standard Key Pad. This keypad has a typical 3×3 layout of keys. Each key represents a single numeric input when the device is in a numeric mode. The numeric keys from 2 to 9 represent a plurality of alphabetic inputs when the device is in text mode. The alphabetic inputs are laid out on the keys in an alphabetic order.

Figure 7:
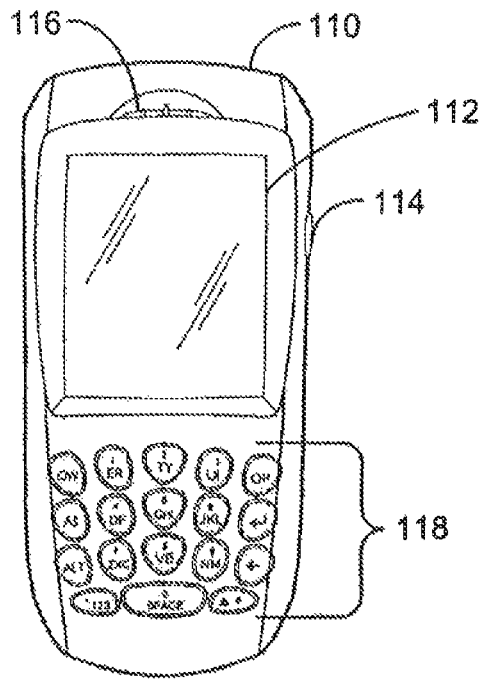
FIG. 7 is a top plan view of an alternative device with a reduced QWERTY keyboard.

Using customized predictive text methods with a device with such a keypad is particularly advantageous because text inputs may be ambiguous and because the layout of the alphabetic inputs is not intuitive to the user. A user is typically accustomed to using QWERTY or DVORAK keyboards when inputting text. FIG. 7 is a top plan view of an alternative device with a reduced QWERTY keyboard. The device 110 is similar to the device 100, with a display 112, and auxiliary input device 114, and voice communication means 116, but has a different keypad layout. The keypad 118 in FIG. 7 uses a 5×3 layout of keys. Each key has a plurality of alphabetic inputs, which are laid out on the keys in a QWERTY keyboard style.

Figure 8:
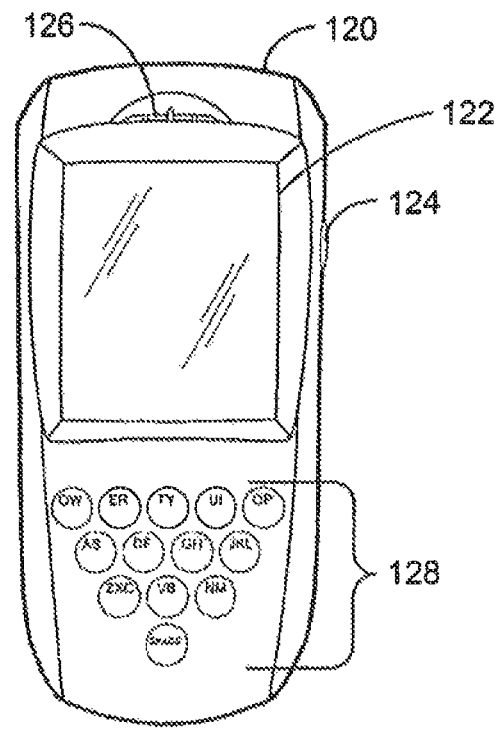
FIG. 8 is a top plan view of a further alternative device with a reduced QWERTY keyboard.

FIG. 8 is a top plan view of a further alternative device with a reduced QWERTY keyboard. The device 120 has a display 122, an auxiliary input device 124, voice communication means 126, and a keypad 128. The keypad 128 utilizes a triangular layout of keys that maintains the QWERTY style layout. The top row of keys preferably has five keys, the next row has four keys, the following row has three keys, and a space bar forms a bottom row. In this embodiment, each character input key is associated with at least two alphabetic inputs.

Figure 9:
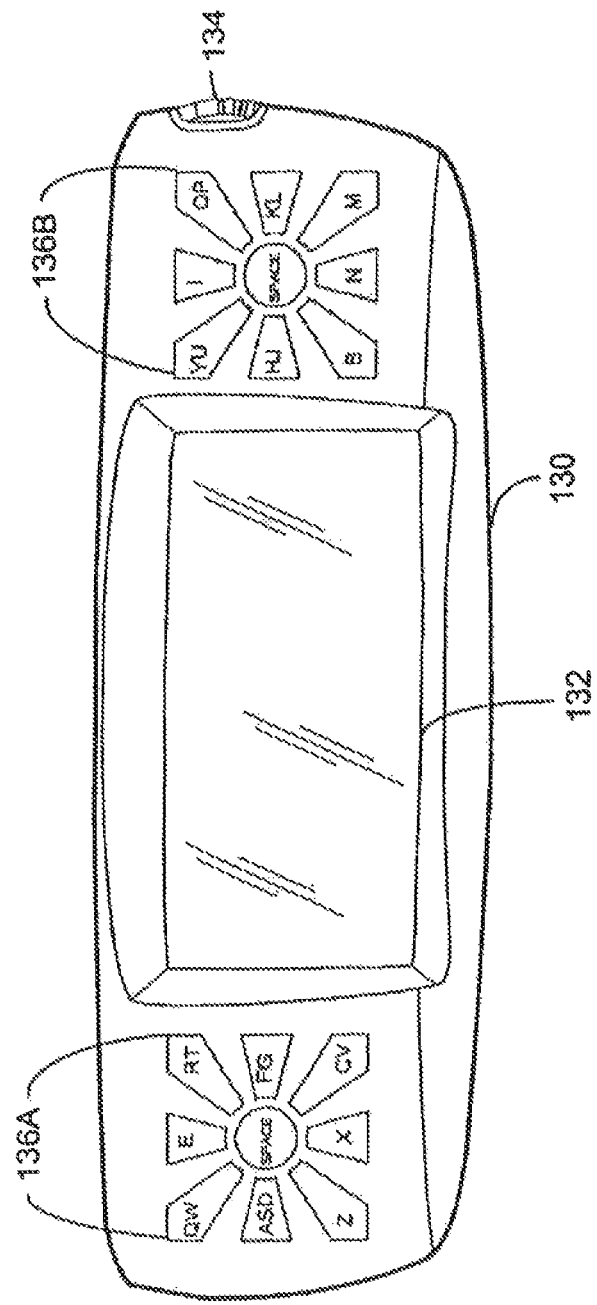
FIG. 9 is a top plan view of another alternative device with a reduced QWERTY keyboard.

FIG. 9 is a top plan view of another alternative device with a reduced QWERTY keyboard. The device 130 comprises a display 132, an auxiliary input device 134, and a keypad in two sections 136A and 136B. The auxiliary input device 134 is a thumbwheel, a button, or any other means of input.

The keypad sections 136A and 136B are on either side of the display 132. The two keypad sections 136A and 136B comprise a plurality of keys surrounding a space button. The QWERTY style layout is maintained on the surrounding keys, some of which are associated with more than one character.

Figure 10:
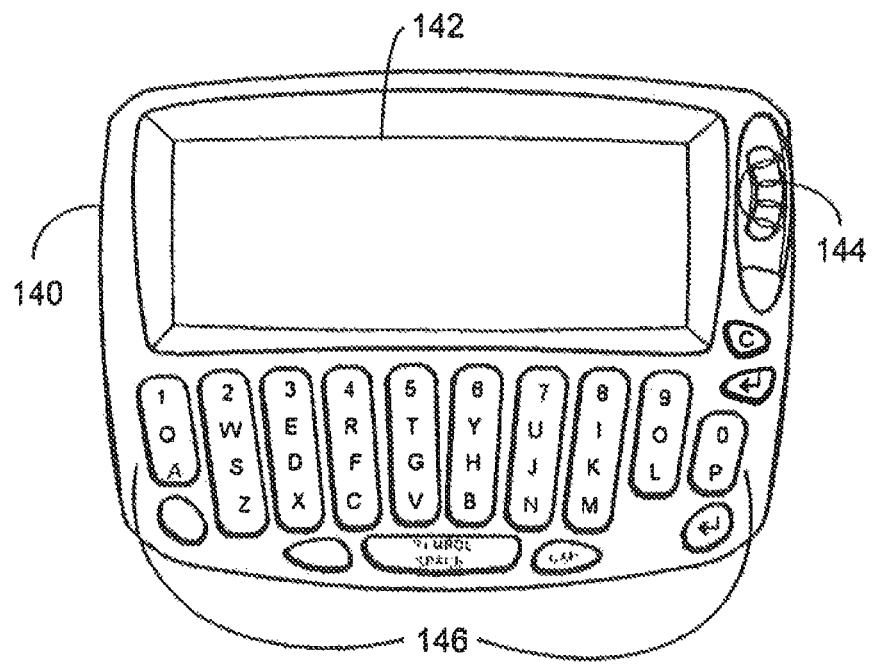
FIG. 10 is a top plan view of a still further alternative device with a reduced QWERTY keyboard.

FIG. 10 is a top plan view of a still further alternative device with a reduced QWERTY keyboard. The device 140 comprises a display 142, an auxiliary input device 144, and a keypad 146 having 10 character input keys which maintain the QWERTY style layout. Each character input key has a plurality of alphabetic inputs.

Figure 11:
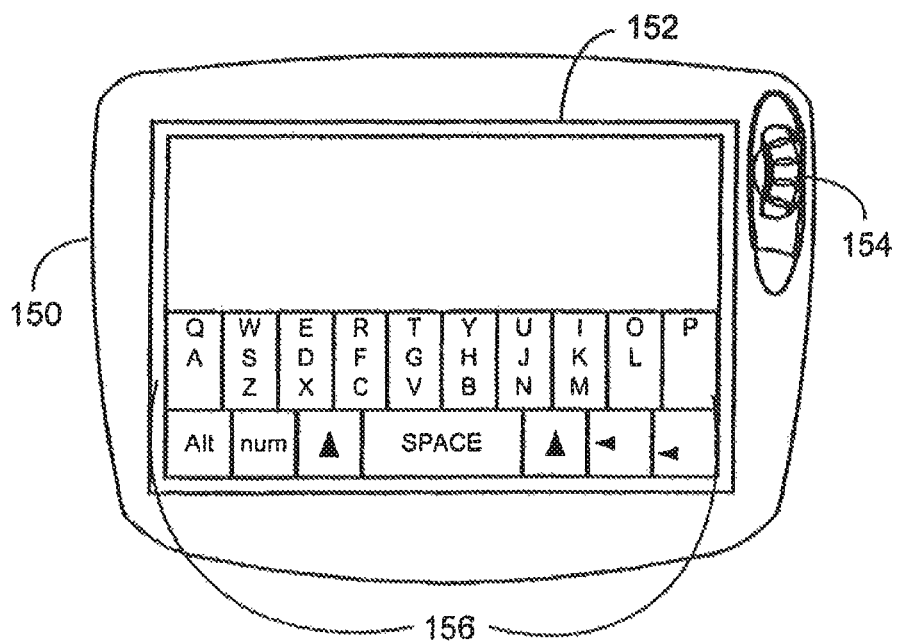
FIG. 11 is a further top plan view of a device with a reduced QWERTY touchscreen.

FIG. 11 is a further top plan view of a device with a reduced QWERTY touchscreen. The device 150 comprises a touchscreen display 152, an auxiliary input device 154, and a keyboard 156 having 10 character input keys. The keyboard 156 may be a touchpad or may be viewed and accessed on the touchscreen display 152.

A predictive text method using a custom word list is valuable for electronic devices using such keypads as shown in FIGS. 6 to 11, because keypad text inputs can be ambiguous. A custom word list on the device is tailored to the user's own word usage patterns. However, predictive text is one application of custom word lists. Other applications include, for example, spell checking and word completion.

Figure 12:
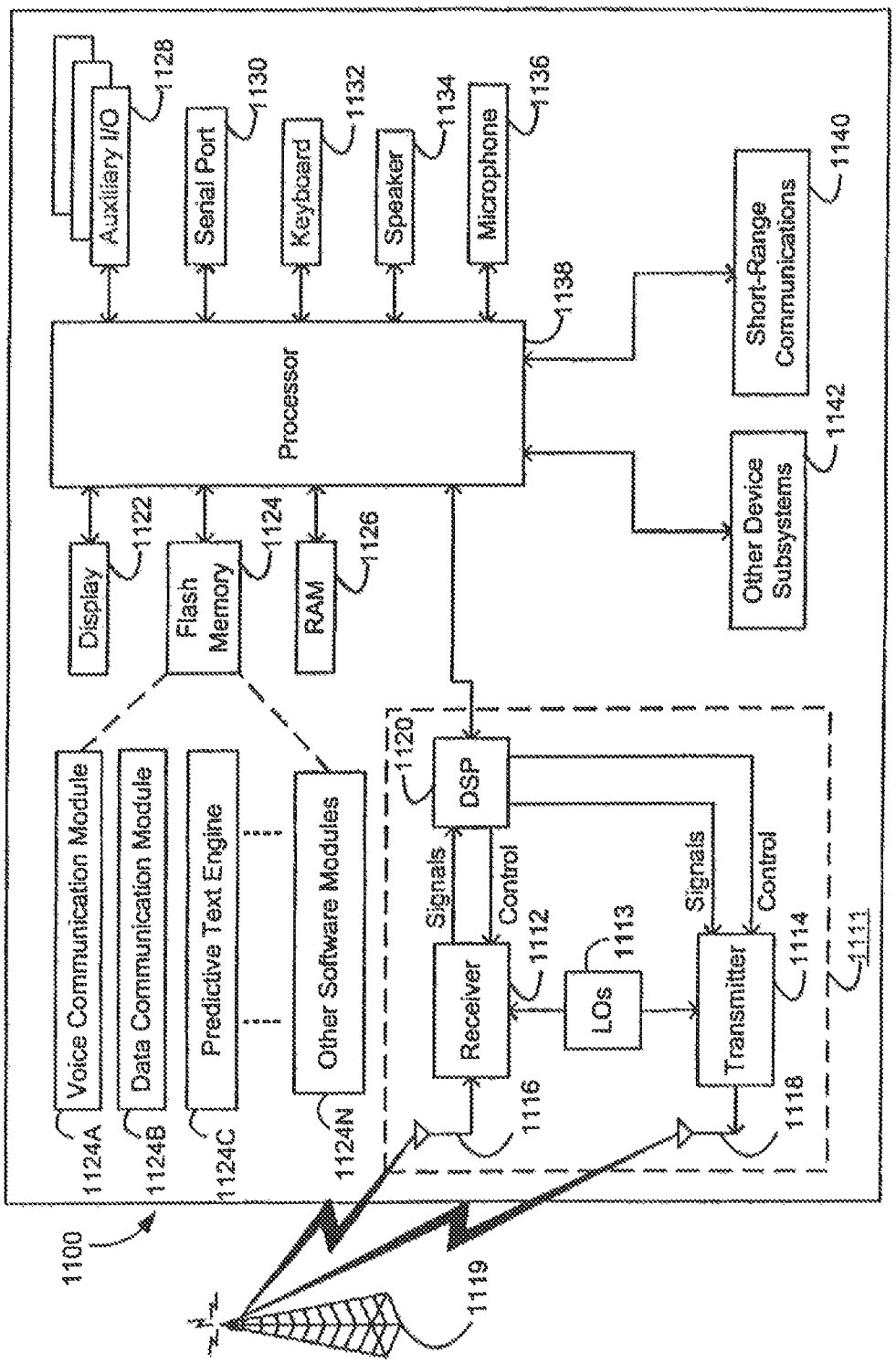
FIG. 12 is a block diagram of an exemplary dual-mode mobile communication device.

FIG. 12 is a block diagram of a wireless mobile communication device 1100, which is one example of an electronic device in which a custom word list might be used. The mobile device 1100 includes a transceiver 1111, a micro-processor 1138, a display 1122, Flash memory 1124, RAM 1126, auxiliary input/output (I/O) devices 1128, a serial port 1130, a keyboard 1132, a speaker 1134, a microphone 1136, a short-range wireless communications sub-system 1140, and other device sub-systems 1142. The transceiver 1111 includes transmit and receive antennas 1116, 1118, a receiver 1112, a transmitter 1114, one or more local oscillators 1113, and a digital signal processor 1120. Within the Flash memory 1124, the device 1100 preferably includes a plurality of soft-ware modules 1124A-1124N that can be executed by the micro-processor 1138 (and/or the DSP 1120), including a voice communication module 1124A, a data communication module 1124B, a predictive text engine 1124C, and a plurality of other operational modules 1124N for carrying out a plurality of other functions.

The mobile communication device 1100 is preferably a two-way communication device having voice and data communication capabilities. Thus, for example, the device may communicate over a voice network, such as any of the analog or digital cellular networks, and may also communicate over a data network. The voice and data networks are depicted in FIG. 12 by the communication tower 1119. These voice and data networks may be separate communication networks using separate infrastructure, such as base stations, network controllers, etc., or they may be integrated into a single wireless network.

The transceiver 1111 is used to communicate with the voice and data network 1119, and includes the receiver 1112, the transmitter 1114, the one or more local oscillators 1113, and the DSP 1120. The DSP 1120 is used to send and receive signals to and from the transmitter 1114 and receiver 1112, and is also utilized to provide control information to the transmitter 1114 and receiver 1112. If the voice and data communications occur at a single frequency, or closely-spaced set of frequencies, then a single local oscillator 1113 may be used in conjunction with the transmitter 1114 and receiver 1112. Alternatively, if different frequencies are utilized for voice communications versus data communications, then a plurality of local oscillators 1113 can be used to generate a plurality of frequencies corresponding to the voice and data networks 1119. Although two antennas 1116, 1118 are depicted in FIG. 12, the mobile device 1100 could be used with a single antenna structure. Information, which includes both voice and data information, is communicated to and from the communication module 1111 via a link between the DSP 1120 and the microprocessor 1138.

The detailed design of the transceiver 1111, such as frequency band, component selection, power level, etc., is dependent upon the communication network 1119 in which the device is intended to operate. For example, a device 1100 intended to operate in a North American market may include a transceiver 1111 designed to operate with the Mobitex™ or DataTAC™ mobile data communication networks and also designed to be operated with any of a variety of voice communication networks, such as AMPS, TDMA, CDMA, PCS, etc., whereas a device 1100 intended for use in Europe may be configured to operate with the General Packet Radio Service (GPRS) data communication network and the GSM voice communication network. Other types of data and voice networks, both separate and integrated, may also be utilized with the mobile device 1100.

Depending upon the type of network 1119, the access requirements for the dual-mode mobile device 1100 may also vary. For example, in the Mobitex and DataTAC data networks, mobile devices are registered on the network using a unique identification number associated with each device. In GPRS data networks, however, network access is associated with a subscriber or user of a device 1100. A GPRS device typically requires a subscriber identity module ("SIM"), which is required in order to operate the device 1100 on a GPRS network. Local or non-network communication functions (if any) may be operable, without the SIM device, but the device 1100 will be unable to carry out any functions involving communications over the data network 1119, other than any legally required operations, such as 911 emergency calling.

After any required network registration or activation procedures have been completed, the dual-mode device 1100 may send and receive communication signals, including both voice and data signals, over the network 1119. Signals received by the antenna 1116 from the communication network 1119 are routed to the receiver 1112, which provides for signal amplification, frequency down conversion, filtering, channel selection, etc., and analog to digital conversion. Analog to digital conversion of the received signal allows more complex communication functions, such as digital demodulation and decoding, to be performed using the DSP 1120. In a similar manner, signals to be transmitted to the network 1119 are processed, including modulation and encoding, for example, by the DSP 1120 and are then provided to the transmitter 1114 for digital to analog conversion, frequency up conversion, filtering, amplification and transmission to the communication network 1119 (or networks) via the antenna 1118. Although a single transceiver 1111 is shown in FIG. 12 for both voice and data communications, it is possible that the device 1100 may include two distinct transceivers, a first transceiver for transmitting and receiving voice signals, and a second transceiver for transmitting and receiving data signals. Separate transceivers may instead be implemented in the device 1100 for different frequency bands, for example.

In addition to processing the communication signals, the DSP 1120 also provides for receiver and transmitter control. For example, the gain levels applied to communication signals in the receiver 1112 and transmitter 1114 may be adaptively controlled through automatic gain control algorithms implemented in the DSP 1120. Other transceiver control algorithms could also be implemented in the DSP 1120 in order to provide more sophisticated control of the transceiver 1111.

The microprocessor 1138 preferably manages and controls the overall operation of the dual-mode mobile device 1100. Many types of microprocessors or microcontrollers could be used here, or, alternatively, a single DSP 1120 could be used to carry out the functions of the microprocessor 1138. Low-level communication functions, including at least data and voice communications, are performed through the DSP 1120 in the transceiver 1111. Other, high-level communication applications, such as a voice communication application 1124A, and a data communication application 1124B are stored in the Flash memory 1124 for execution by the microprocessor 1138. For example, the voice communication module 1124A may provide a high-level user interface operable to transmit and receive voice calls between the dual-mode mobile device 1100 and a plurality of other voice devices via the network 1119. Similarly, the data communication module 1124B may provide a high-level user interface operable for sending and receiving data, such as email messages, files, organizer information, short text messages, etc., between the dual-mode mobile device 1100 and a plurality of other data devices via the network 1119. The predictive text engine 1124C uses a custom word list, preferably also stored in the Flash memory 1124, as described above.

The microprocessor 1138 also interacts with other device subsystems, such as the display 1122, Flash memory 1124, random access memory (RAM) 1126, auxiliary input/output (I/O) subsystems 1128, serial port 1130, keyboard 1132, speaker 1134, microphone 1136, a short-range communications subsystem 1140 and any other device subsystems generally designated as 1142.

Some of the subsystems shown in FIG. 12 perform communication-related functions, whereas other subsystems may provide "resident" or on-device functions. Notably, some subsystems, such as keyboard 1132 and display 1122 may be used for both communication-related functions, such as entering a text message for transmission over a data communication network, and device-resident functions such as a calculator or task list or other FDA type functions.

Operating system software used by the microprocessor 1138 is preferably stored in a non-volatile store such as Flash memory 1124. Those skilled in the art will appreciate that a non-volatile store may be implemented using other components than the Flash memory 1124, including a battery backed-up RAM, for example. In addition to the operation system, which controls all of the low-level functions of the device 1100, the Flash memory 1124 may include a plurality of high-level software application programs, or modules, such as a voice communication module 1124A, a data communication module 1124B, an organizer module (not shown), a predictive text engine 1124C, or any other type of software module 1124N. The Flash memory 1124 also may include a file system for storing data, and preferably includes a word list store for storing a custom word list. These modules are executed by the microprocessor 1138 and provide a high-level interface between a user of the device and the device. This interface typically includes a graphical component provided through the display 1122, and an input/output component provided through the auxiliary I/O 1128, keyboard 1132, speaker 1134, and microphone 1136. The operating system, specific device applications or modules, or parts thereof, may be temporarily loaded into a volatile store, such as RAM 1126 for faster operation. Moreover, received communication signals may also be temporarily stored to RAM 1126, before permanently writing them to a file system located in the persistent store 1124.

An exemplary application module 1124N that may be loaded onto the dual-mode device 1100 is a personal information manager (PIM) application providing PDA functionality, such as calendar events, appointments, and task items. This module 1124N may also interact with the voice communication module 1124A for managing phone calls, voice mails, etc., and may also interact with the data communication module for managing email communications and other data transmissions. Alternatively, all of the functionality of the voice communication module 1124A and the data communication module 1124B may be integrated into the PIM module.

The Flash memory 1124 preferably provides a file system to facilitate storage of PIM data items on the device. The PIM application preferably includes the ability to send and receive data items, either by itself, or in conjunction with the voice and data communication modules 1124A, 1124B, via the wireless network 1119. The PIM data items are preferably seamlessly integrated, synchronized and updated, via the wireless network 1119, with a corresponding set of data items stored or associated with a host computer system, thereby creating a mirrored system for data items associated with a particular user.

The mobile device 1100 may also be manually synchronized with a host system by placing the device 1100 in an interface cradle, which couples the serial port 1130 of the mobile device 1100 to the serial port of the host system. The serial port 1130 may also be used to enable a user to set preferences through an external device or software application, or to download other application modules 1124N for installation. This wired download path may be used to load an encryption key onto the device, which is a more secure method than exchanging encryption information via the wireless network 1119.

Additional application modules 1124N may be loaded onto the dual-mode device 1100 through the network 1119, through an auxiliary I/O subsystem 1128, through the serial port 1130, through the short-range communications subsystem 1140, or through any other suitable subsystem 1142, and installed by a user in the Flash memory 1124 or RAM 1126. Such flexibility in application installation increases the functionality of the device 1100 and may provide enhanced on-device functions, communication-related functions, or both. For example, secure communication applications may enable electronic commerce functions and other such financial transactions to be performed using the device 1100. Custom word list loading may similarly be performed through any of these communication interfaces.

When the dual-mode device 1100 is operating in a data communication mode, a received signal, such as a text message or a web page download, is processed by the transceiver 1111 and provided to the microprocessor 1138, which preferably further processes the received signal for output to the display 1122, or, alternatively, to an auxiliary I/O device 1128. A user of dual-mode device 1100 may also compose data items, such as email messages, using the keyboard 1132, which is preferably a complete or reduced alphanumeric keyboard laid out in the QWERTY style, although other styles of complete or reduced alphanumeric keyboards such as the known DVORAK style may also be used. User input to the device 1100 is further enhanced with a plurality of auxiliary I/O devices 1128, which may include a thumbwheel input device, a touchpad, a variety of switches, a rocker input switch, etc. The composed data items input by the user may then be transmitted over the communication network 1119 via the transceiver 1111.

When the dual-mode device 1100 is operating in a voice communication mode, the overall operation of the device 1100 is substantially similar to the data mode, except that received signals are preferably be output to the speaker 1134 and voice signals for transmission are generated by a microphone 1136. Alternative voice or audio I/O subsystems, such as a voice message recording subsystem, may also be implemented on the device 1100. Although voice or audio signal output is preferably accomplished primarily through the speaker 1134, the display 1122 may also be used to provide an indication of the identity of a calling party, the duration of a voice call, or other voice call related information. For example, the microprocessor 1138, in conjunction with the voice communication module and the operating system software, may detect the caller identification information of an incoming voice call and display it on the display 1122.

The short-range communications subsystem 1140 may include such components as an infrared device and associated circuits and components, or a Bluetooth or 802.11 short-range wireless communication module to provide for communication with similarly-enabled systems and devices.

The mobile device 1100 is one example of an electronic device in which a custom word list may be useful. Such a device may be a data communication device, a voice communication device, a dual-mode device having both voice and data communication capabilities such as a mobile telephone with data communication functionality, a pager, an email communication device, or a PDA enabled for communications, for example. However, the present invention may also be applied to electronic devices that have not been enabled for communications, including such devices as organizers and personal digital assistants (PDAs).

It will be appreciated that the above description relates to the preferred embodiment by way of example only. Many variations on the invention will be obvious to those knowledgeable in the field, and such obvious variations are within the scope of the invention as described and claimed, whether or not expressly described.

For example, a custom word list building system may allow the user to specify the type, author, age or date/time range, and the like, of text items to be scanned. This may be implemented through a pop-up search dialog box, which appears before the scan starts.

Alternatively, rather than having the user select the documents from which the text items are collected, the building system may simply select all documents which have been created since the last transfer of a custom word list between the building system and the electronic device so that text items from all documents may be collected.

In order to provide a word list that is particularly customized for a user, the building system scans portions of text items that were composed by the user. In a reply email message, for example, a scanning module at the building system scans text that precedes a predetermined separator pattern that precedes an original email message to which the user replied. In this case, the user's own text is scanned to build the custom word list, but text composed by others does not significantly affect the custom word list.

The above-described embodiments of the present invention are intended to be examples only. Alterations, modifications and variations may be effected to the particular embodi-

What is claimed is:

1. A system for building a custom word list for use in text operations on an electronic device comprising:
a processor; and
a memory storing instructions that, when executed by the processor, cause the processor to perform operations comprising:
determining a source associated with a text item,
identifying words in the text item composed by and associated with a user, and
assigning a weighting to each identified word based in part on the source of the text item, wherein the source is determined based on an identity of the user associated with at least one portion of the text item.

2. The system of claim 1, wherein the operation of identifying further comprises identifying words preceding a separator pattern.

3. The system of claim 1, wherein the text item includes an email message.

4. The system of claim 1, wherein the instructions further cause the processor to perform the operation of adjusting the weighting of an identified word when the word is used in text operations on the electronic device.

5. The system of claim 1, wherein the instructions further cause the processor to perform the operation of storing each identified word and its corresponding weighting.

6. The system of claim 1, wherein the instructions further cause the processor to perform the operations of:
categorizing the identified words into categories; and
storing an indicator of the category of each identified word with the word and its corresponding weighting,
wherein the categories include at least one of addresses, names, hyperlinks, recurring word groupings, different language categories, and user added words.

7. The system of claim 1, wherein the instructions further cause the processor to perform the operation of receiving a selection input to select text items to be included in the text item.

8. The system of claim 1, wherein the text item is stored at a computer system.

9. The system of claim 8, further comprising receiving wherein the operations of identifying, determining, and assigning are performed at the computer system, and wherein the instructions further cause the processor to perform the operations of:
mapping each identified word to a keystroke sequence for the electronic device; and
transferring the identified words and their corresponding weightings and keystroke sequences to the electronic device.

10. The system of claim 8, wherein the instructions further cause the processor to perform the operations of:
determining a type of the electronic device attempting to load the custom word list from the computer system, wherein the mapping operation further includes mapping each identified word to a keystroke sequence for the type of the electronic device.

11. The system of claim 1, wherein at least one of the identified words comprise a number of words.

12. A method for building a custom word list for use in text operations on an electronic device comprising:
determining a source associated with a text item;
identifying words in the text item composed by and associated with a user; and
assigning a weighting to each identified word based in part on the source of the text item, wherein the source is determined based on an identity of the user associated with at least one portion of the text item.

13. The method of claim 12, wherein identifying further comprises identifying words preceding a separator pattern.

14. The method of claim 12, wherein the text item includes an email message.

15. The method of claim 12, further comprising adjusting the weighting of an identified word when the word is used in text operations on the electronic device.

16. The method of claim 12, further comprising storing each identified word and its corresponding weighting.

17. The method of claim 12, further comprising:
categorizing the identified words into categories; and
storing an indicator of the category of each identified word with the word and its corresponding weighting,
wherein the categories include at least one of addresses, names, hyperlinks, recurring word groupings, different language categories, and user added words.

18. The method of claim 12, further comprising receiving a selection input to select text items to be included in the text item.

19. The method of claim 12, wherein the text item is stored at a computer system.

20. The method of claim 19, wherein identifying, determining, and assigning are performed at the computer system, and further comprising, at the computer system:
mapping each identified word to a keystroke sequence for the electronic device; and
transferring the identified words and their corresponding weightings and keystroke sequences to the electronic device.

21. The method of claim 19, further comprising:
determining a type of the electronic device attempting to load the custom word list from the computer system, wherein the mapping operation further includes mapping each identified word to a keystroke sequence for the type of the electronic device.

22. The method of claim 12, wherein at least one of the identified words comprise a number of words.

* * * * *